May 2, 1950 C. V. TILDEN 2,506,474
DRILL BIT
Filed Sept. 20, 1947
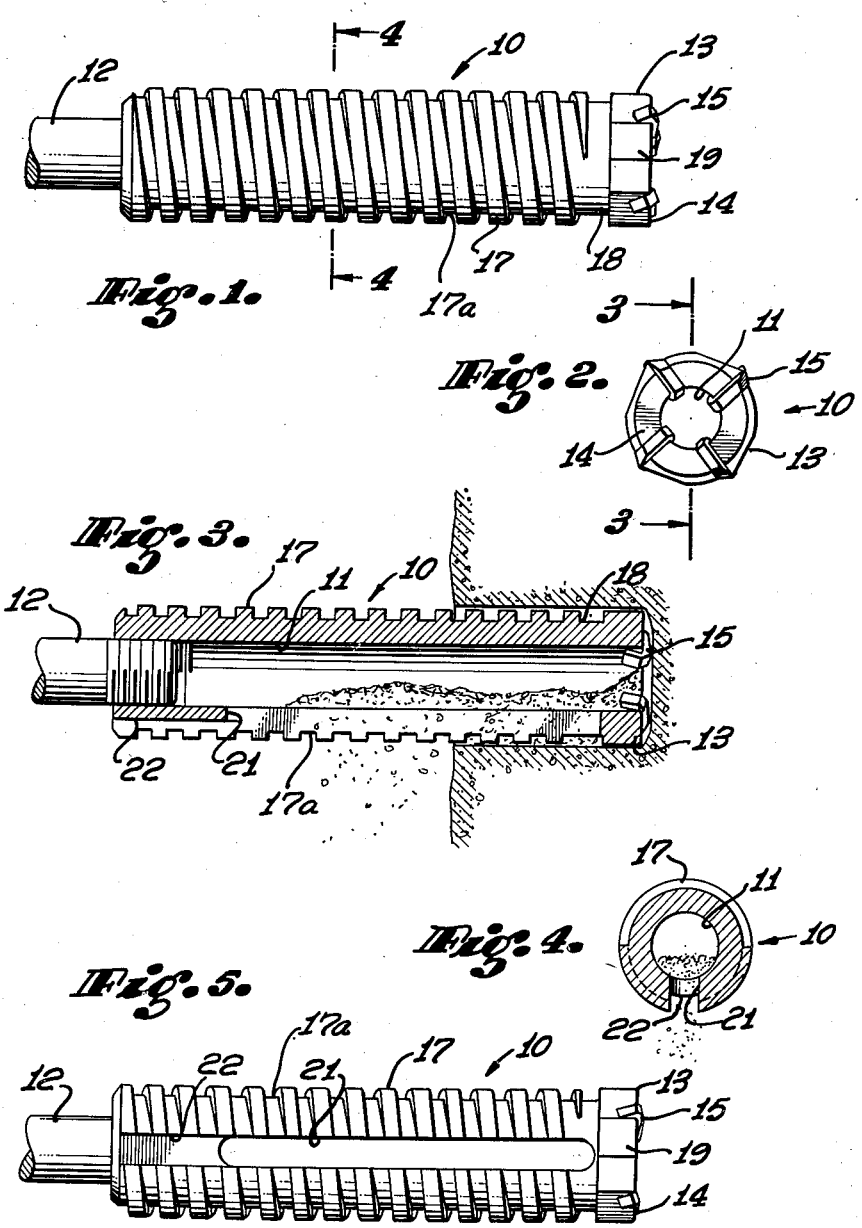
INVENTOR.
CARL V. TILDEN
BY
ATTORNEY.

Patented May 2, 1950

2,506,474

UNITED STATES PATENT OFFICE 2,506,474

DRILL BIT

Carl V. Tilden, Altadena, Calif.

Application September 20, 1947, Serial No. 775,186

5 Claims. (Cl. 255—69)

My invention relates generally to rotary bits and particularly to bits for drilling holes in hard granular structures such as brick, concrete, and other masonry formed of aggregate and binding material.

More particularly my invention has reference to drill bits of the type having a solid body with a disc-shaped head of concentric external circumference fixed on one end of the body concentrically to the axis of rotation thereof; teeth set radially in the face of the head and perpendicular to the axis of rotation; and with or without a screw thread or auger on the exterior of the body for removing material cuttings from the hole being drilled.

Bits of this character as heretofore proposed have a low drilling efficiency for the reason that as drilling proceeds in a hole the drill is not relieved of the material cuttings with sufficient rapidity to prevent accumulation thereof in the hole. As a consequence, the accumulated cuttings offer considerable resistance to rotation of the drill, and hence, impede its drilling action, thus requiring more time and power than is actually necessary to drill a hole of any given depth.

Accordingly, it is a purpose of my invention to provide a drill bit of this type which is characterized functionally by its ability when drilling a hole in masonry, to continuously and completely remove the material cut from the cutting face of the bit, as well as from the hole, in a manner to continuously relieve the bit and hole of the cut material, and to thus accelerate the drilling action of the bit to the extent of greatly reducing the power and time required to drill a hole of any given depth.

It is also a purpose of my invention to provide a drill bit which embodies dual means for conveying the material from the hole cut by the bit, one of these means being exterior and the other interior to the body of the bit, with the two means joining at a point spaced from the cutting face in a manner in which they may further reduce large particles to sizes which may be easily conveyed from the bit and the hole, to the end of rapidly relieving the bit and the hole of all cuttings and thereby increasing the ease and speed with which the bit drills.

I will describe only one form of drill bit embodying my invention, which is subject to various modifications within the scope and spirit of my invention, and will then point out the novel features thereof in claims.

In the accompanying drawings:

Fig. 1 is a side elevational view of a drill bit embodying my invention.

Fig. 2 is an end view of the drill bit, showing the cutting face thereof.

Fig. 3 is a longitudinal sectional view on the lines 3—3 of Fig. 2 illustrative of the drilling action of the drill bit in a masonry structure.

Fig. 4 is a cross-sectional view taken on the lines 4—4 of Fig. 1.

Fig. 5 is an elevational view, similar to Fig. 1, but with the drill bit rotated ninety degrees to illustrate the slot communicating between the exterior of the bit and the interior thereof.

Having specific reference to the drawings, this embodiment of my invention comprises an elongated body 10 of circular cross-section having an axial bore 11. The bore 11 is closed at the trailing or proximal end of the body 10, by a shank 12 secured thereto, so that the bore forms a passage, pocket or recess. The leading or distal end of the body 10 is enlarged to form an annular head 13, and the face 14 thereof has teeth 15 set therein. The teeth 15, which may be four or any other suitable number, are preferably made of cemented carbide, and are disposed in a circle around the bore 11, so that their cutting edges are approximately radial to the head 13, while their outer ends project outwardly from the periphery of the head, and their inner ends project into the bore 11, as best illustrated in Fig. 2.

A spiral thread 17 is provided on the outer surface of the body 10, forming an auger for carrying away cuttings in the form of granules of the material being drilled. The thread 17 is preferably of square cross-section, in the manner of a Sellers Square thread, and extends from a point near the head 13 to the proximal end of the body 10. Between the distal end of the thread 17 and the head 13, the body 10 is reduced in size to its diameter at the bottom of the grooves 17a of the thread, so as to leave an annular groove 18 adjacent to the head. The periphery of the head 13 is flattened, as at 19 (see Fig. 5), to form shallow channels or clearances in advance of each of the teeth 15, leading from the face 14 to the annular groove 18 when the bit is inserted in a hole, and through which finely comminuted particles may pass between the outer ends of the teeth 15 to the groove 18, and thence to the auger thread 17.

A slot 21 is formed in and extends longitudinally of the body 10 from a point where it intersects the annular groove 18 to a point a few threads distant from the proximal end of the body 10. The slot 21 communicates with the bore 11 and interrupts the threads of the auger thread 17 where it intersects them, providing a passage for granular material and chips from the bore 11 to the auger thread along the major part of the latter. A shallow longitudinal groove 22 extends from and in continuation of the slot 21, to the proximal end of the body 10, providing a passage supplementary to the slot or to that passage provided by the auger thread 17 by which the drilled-out material may reach the zone around the shank 12.

In the operation of drilling a hole in masonry structures, the teeth 15 will cut an annular channel therein, tending to form a central core in the leading end of the bore 11, but because the inner ends of the teeth project into the bore 11 they operate to grind up the core as it is formed. Because the outer ends of the teeth 15 project slightly beyond the periphery of the head 13, the hole will be slightly oversize and will not bind upon the bit as the bit progresses inwardly.

Finely comminuted material, cut from the face of the hole by the teeth 15, will move through the clearances 19 to the annular groove 18 and thence to the auger thread groove 17a by which it is removed from the hole. Those particles of the material dislodged at the face of the hole will enter the bore 11 through the open end thereof between the inner ends of the teeth 15 to be subjected to the grinding action of the teeth in the disintegration of the core as it is formed, and thus the core is broken up as rapidly as it is formed to offer no impediment to the free flow of the material into the bore.

The slot 21 permits the material to be thrown by centrifugal force outwardly of the side of the bit at that part of the slot projecting from the hole, either when drilling horizontally or downward. When drilling upward the exposed part of the slot allows the material to gravitate from the bit aided, of course, by centrifugal force.

At that part of the bit within the hole, the slot 21 permits the immediate discharge to the auger thread 17 of a part of the material suited in size to passage along the thread. If too large to enter the auger thread they are immediately ground against the wall of the hole and battered by the sides of the slot until suitably comminuted. The sharp inner and outer edges of the slot 21 assist materially in rendering this battering action effective. The Sellers Square thread 17 is also of assistance in this respect, presenting flat radial surfaces and substantially rectangular corners at its intersections with the slot 21, well adapted to batter and grind material passing through the intersections without injury to the thread.

Material entering the auger thread 17 is rapidly conveyed to the face of the masonry structure or, if the entire body of the bit has entered the hole, to the zone around the shank 12. The groove 22, at its points of intersection with the thread 17, provides additional sharp edges by which any large particles that may have travelled to the outer end of the bore 11 before emerging through the slot 21—as for example when the hole being drilled is directed or inclined upwardly—may be further comminuted. Thus the drill will free the hole of all loose material, of either chip or granular size.

Manifestly, a bit constructed in accordance with my invention provides one exterior passage means for conveying the material cut by the teeth to a point exteriorly of the hole, which comprises the auger 17, and an interior passage means for conveying the material cut likewise to a point exteriorly of the hole, which comprises the bore or recess 11 and the slot 21. These two means coact one with the other to constantly relieve the teeth of the cuttings; to reduce the cuttings to sizes which can freely pass out of the groove 17a, or out of the interior of the bit through the slot 21; and to utilize the rotary motion of the bit to impel the cuttings into both the groove 17a and the slot 21, and thus cause the cuttings to emerge from the hole from points interiorly and exteriorly of the bit simultaneously. Thus the bit operates to establish and maintain a constant flow of the loose material out of the hole to reduce its resistance to rotation of the bit, and to thereby increase the speed with which a hole may be drilled by the bit.

Although I have herein shown and described only one form of drill bit embodying my invention, it is to be understood that various changes and modifications may be made therein without departing from the spirit of my invention and the spirit and scope of the appended claims.

I claim:

1. A rotary bit for drilling concrete, including: an elongate, cylindrical body having an axial bore and formed at the trailing end with means for connection with a rotating tool; said body being enlarged at the leading end thereof to form an annular head of greater diameter than said body, said head being provided in the face thereof with teeth disposed on a plurality of equally angularly spaced radii, the body being provided on the outer surface thereof with a spiral thread forming an auger and with a single slot extending transversely through said thread, said slot commencing at a point adjacent the leading end of and extending longitudinally of and terminating at a point spaced from the trailing end of the body, said slot establishing communication between said bore and the exterior of said body, and said slot providing a lateral outlet for the material released within the area defined by said teeth during rotation thereof.

2. A rotary bit for drilling concrete, including: an elongate, cylindrical body having an axial bore and formed at the trailing end with means for connection with a rotating tool; said body being enlarged at the leading end thereof to form an annular head of greater diameter than said body, said head being provided in the face thereof with teeth disposed on a plurality of equally angularly spaced radii and having their outer ends projecting outwardly from the periphery of the head and their inner ends projecting into the bore of said body, the body being provided on the outer surface thereof with a spiral thread forming an auger and with a single slot extending transversely through said thread, said slot commencing at a point adjacent the leading end of and extending longitudinally of and terminating at a point spaced from the trailing end of the body, said slot establishing communication between said bore and the exterior of said body, and said slot providing a lateral outlet for the material released within the area defined by said teeth during rotation thereof.

3. A rotary bit for drilling concrete, including: an elongate, longitudinally bored, cylindrical body having at the trailing end thereof a removable closure means comprising a tool for rotating said body; said body, having an enlarged head at the leading end thereof provided with a plurality of planar surfaces and having in the face thereof a plurality of teeth disposed on a plurality of equally, angularly spaced radii with their outer ends projecting outwardly from the periphery of said head and their inner ends projecting into the bore of said body for disintegrating the cut material within the area defined by said teeth; said body having an exterior auger thread terminating short of the head thereof and defining between said head and such terminus an annular groove for receiving detrital material produced by the teeth and delivering it to the auger thread for removal from the hole; and said body having a longitudinal linear slot extending between the leading end and trailing end and communicating with the exterior of said body for conveying detrital material interiorly along and laterally outward of said body to a point beyond the material being drilled.

4. A rotary bit for drilling concrete, including: an elongate, cylindrical body having an axial bore and formed at the trailing end with means for connection with a rotating tool; said body being provided in the face of the leading end thereof with teeth disposed on a plurality of angularly spaced radii and having their outer ends projecting outwardly from the periphery of the body and their inner ends projecting into the bore of said body, the body being provided on the outer surface thereof with a spiral thread forming an auger and with a single slot extending transversely through said thread and longitudinally of the body and establishing communication between said bore and the exterior of said body, said slot providing a lateral outlet for the material released within the area defined by said teeth during rotation thereof.

5. A rotary bit for drilling concrete, including: an elongate, cylindrical body having an axial bore and formed at the trailing end with means for connection with a rotating tool; said body being provided in the face of the leading end thereof with teeth disposed on a plurality of equally angularly spaced radii and having their outer ends projecting outwardly from the periphery of the body and their inner ends projecting into the bore of said body, the body being provided on the outer surface thereof with a spiral thread forming an auger and with a single slot extending transversely through said thread, said slot commencing at a point adjacent the leading end of and extending longitudinally of and terminating at a point spaced from the trailing end of the body, said slot establishing communication between said bore and the exterior of said body, and said slot providing a lateral outlet for the material released within the area defined by said teeth during rotation thereof.

CARL V. TILDEN.

REFERENCES CITED

The following references are of record in the file of this patent:

UNITED STATES PATENTS

| Number | Name | Date |
|---|---|---|
| 52,632 | Whittlesey | Feb. 13, 1866 |
| 218,374 | Fishburn | Aug. 12, 1879 |
| 418,903 | Weiss | Jan. 7, 1890 |
| 483,210 | Corrigan | Sept. 27, 1892 |
| 831,056 | Gilmore | Sept. 18, 1906 |
| 1,484,352 | Izard | Feb. 19, 1924 |
| 1,512,841 | Gamble | Oct. 21, 1924 |
| 2,308,042 | Barnett | Jan. 12, 1943 |
| 2,425,132 | Stokes | Aug. 5, 1947 |